E. HICKEY.
DETACHABLE BAIL.
APPLICATION FILED MAY 6, 1909.
956,349.
Patented Apr. 26, 1910.
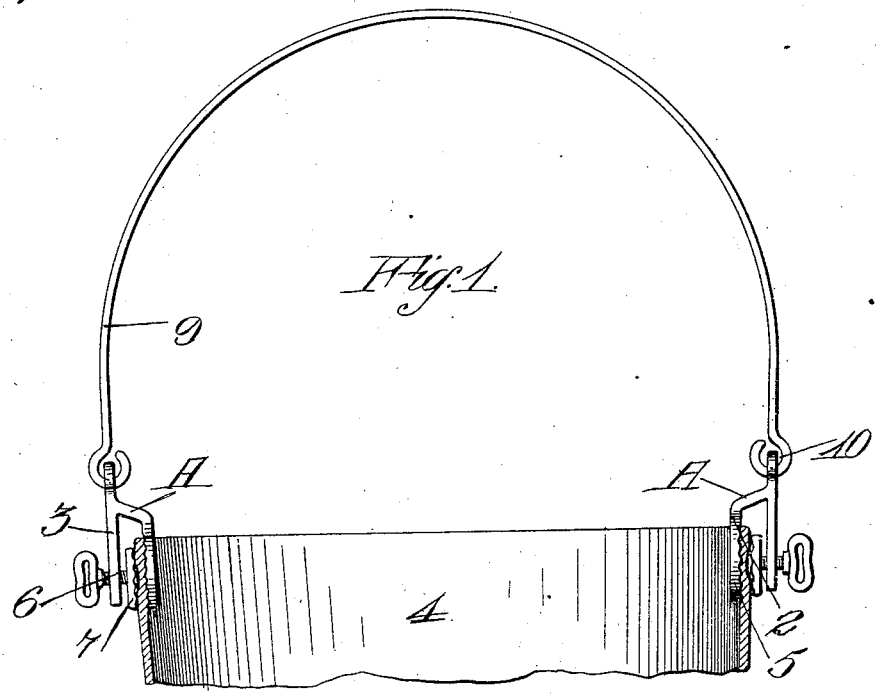
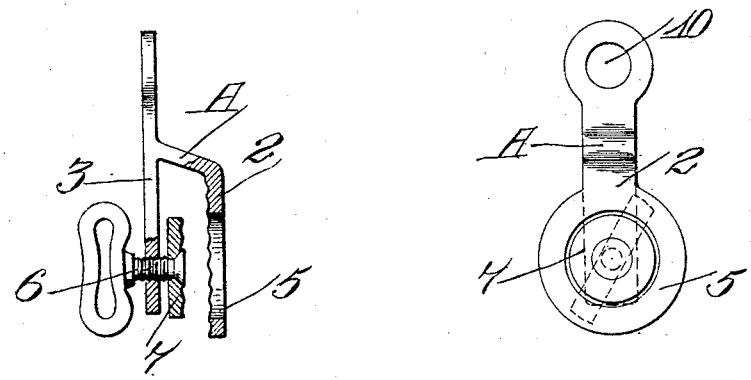

UNITED STATES PATENT OFFICE.

EDWARD HICKEY, OF SAWYERS BAR, CALIFORNIA.

DETACHABLE BAIL.

956,349.     Specification of Letters Patent.     Patented Apr. 26, 1910.

Application filed May 6, 1909. Serial No. 494,307.

*To all whom it may concern:*

Be it known that I, EDWARD HICKEY, citizen of the United States, residing at Sawyers Bar, in the county of Siskiyou and State of California, have invented new and useful Improvements in Detachable Bails, of which the following is a specification.

My invention relates to a detachable bail and carrier for pails and other receptacles.

The object of the invention is to devise a simple, cheap, practical, detachable means for connecting a bail to a pail or the like.

The invention consists of the parts and the construction and combination of parts as hereinafter more fully described and claimed, having reference to the accompanying drawings, in which—

Figure 1 is a section of a bucket, showing the application of my invention. Fig. 2 is a side elevation of the clamp, partly in section. Fig. 3 is a front view of same.

A represents the clamp forming part of the invention, which clamp has two rigid, integrally connected clamp members 2 and 3. The fork or bifurcation thus formed by the clamp 2—3 is adapted to straddle the edge of a pail 4 or other receptacle to which the invention is applicable. The member 2 is enlarged at the lower end and shaped into the form of a ring 5.

6 is a clamp nut threaded in the lower end of the fork 3 and approximately in axial line with the ring 5; and 7 is a washer or jaw member swiveled on the end of the screw 6, and movable with the screw toward and from the ring. Preferably the adjacent sides of the jaw members 7 and 5 are corrugated, and also, preferably the member 7 is of trifling less diameter than the hole in the member 5, so that when the screw is tightened to cause the opposed jaw members 7 and 5 to grip the edge of the pail or vessel, the member 7 will act to concave slightly the side of the vessel, and absolutely prevent the accidental detachment of the clamp from the pail.

The clamp A is connected with any suitable form of a handle, and preferably, as here shown, a bail 9 is adapted to be engaged in eyes 10 suitably formed at the top of the clamp A.

Having thus described my invention, what I claim and desire to secure by Letters Patent is—

1. The combination with a bail having eyes formed at the ends thereof, of a pair of detachable clamp members having eyes engaged by the eyes of the bail, and each of said clamp members comprising a forked portion to straddle the edge of the vessel to which the device is applied, one of the forks of each clamp having a ring-shaped portion, and the other fork carrying a screw with a swiveled washer arranged in axial line with the ring and movable toward and from the hole in said ring the opposed faces of the ring portion and washer being roughened.

2. The combination with a bail or the like, of a detachable connection comprising a clamp having integrally formed forked members, one of said members having a ring-shaped portion, and the other member carrying a threaded screw on which is swiveled a washer movable toward and from the hole in said ring, said ring portion having a slightly larger interior diameter than the outside diameter of the washer, the opposed surfaces of the washer and ring portion being corrugated, and the upper end of the clamp member having an eye for the attachment of the bail.

In testimony whereof I have hereunto set my hand in presence of two subscribing witnesses.

EDWARD HICKEY.

Witnesses:
ROGER CARBETT,
J. M. SINGLE.